United States Patent
Mason

[15] 3,695,769
[45] Oct. 3, 1972

[54] OPTICAL COMPARATORS
[72] Inventor: Peter Alan Mason, Kenilworth, Warwickshire, England
[73] Assignee: Wickman Machine Tool Sales Limited, Coventry, Warwickshire, England
[22] Filed: Jan. 12, 1971
[21] Appl. No.: 105,844

[30] Foreign Application Priority Data
Jan. 30, 1970    Great Britain...........356/168

[52] U.S. Cl....................................356/168, 350/30
[51] Int. Cl...........................................G01b 0/04
[58] Field of Search.........356/168, 166, 171; 350/30

[56] References Cited
UNITED STATES PATENTS

| | | |
|---|---|---|
| 2,423,370 | 7/1947 | Butscher.....................350/30 |
| 2,688,899 | 9/1954 | Rantsch......................350/30 |
| 2,489,789 | 11/1949 | Korkosz.....................356/166 |

FOREIGN PATENTS OR APPLICATIONS

| | | |
|---|---|---|
| 645,619 | 11/1950 | Great Britain...........356/168 |

Primary Examiner—Ronald L. Wibert
Assistant Examiner—Jeff Rothenberg
Attorney—Holman & Stern

[57] ABSTRACT

An optical comparator having workpiece support and a platform on which an enlarged layout of a profile can be laid and optical elements for reducing the image and causing it to coincide with an image of the workpiece itself, both the images being visible at the same scale through a microscope of the machine.

7 Claims, 1 Drawing Figure

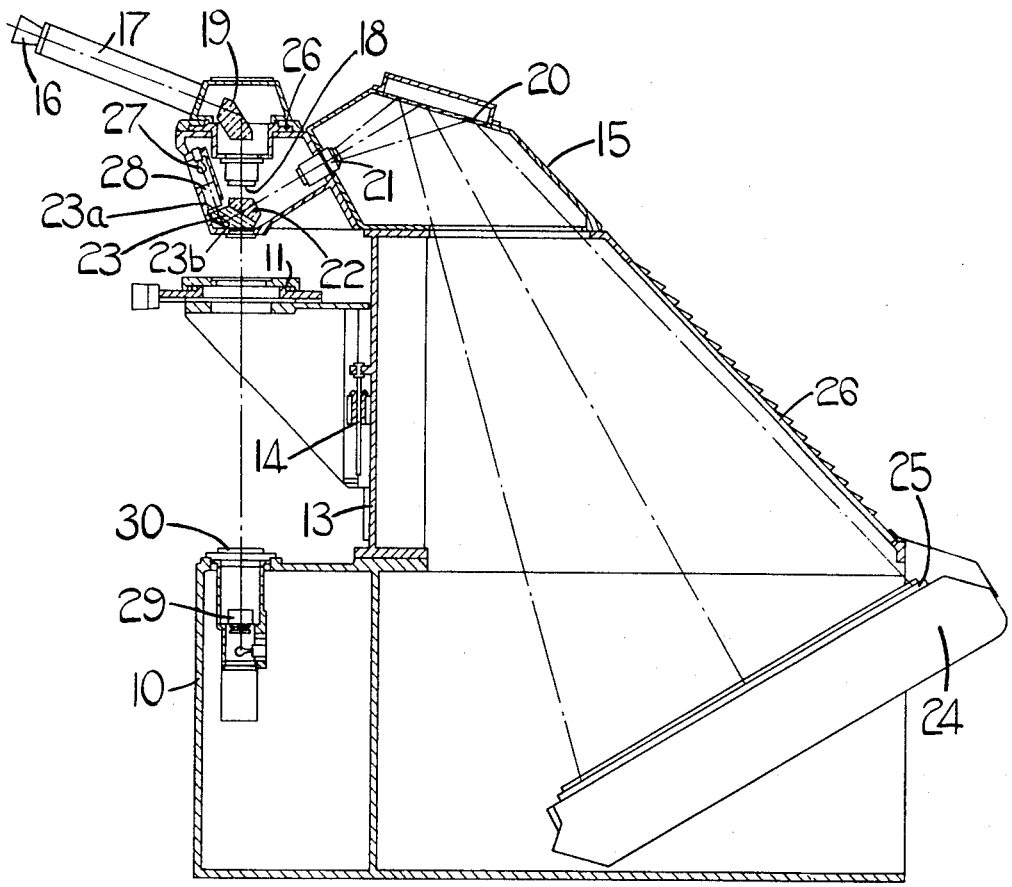

OPTICAL COMPARATORS

This invention relates to machines which are used to compare profiled workpieces with correspondingly shaped profiles on an enlarged drawing or layout, such comparison being carried out optically and for the purpose of checking the accuracy of the workpieces.

In optical comparators of the kind used hitherto, the image of the workpiece has usually been projected onto a screen on which the layout is set out. The necessary enlarged image of the workpiece, however, with the accompanying inevitable diffusion, tends to render its edges somewhat ill-defined, so that it is difficult to determine precisely their positions in relation to the layout, and thus the degree of accuracy of checking is correspondingly limited.

The object of this invention is to provide an optical comparator in a form enabling accurate comparisons to be carried out.

According to the present invention there is provided an optical comparator comprising, in combination, a workpiece support, a platform for supporting an enlarged layout of a profile for comparison with a profiled workpiece, a microscope for viewing the workpiece, and optical elements whereby an image of the layout on the platform can be reduced and superimposed upon the image of the workpiece visible through the microscope, at the same scale.

The invention will now be described by way of example with reference to the accompanying drawing in which the single FIGURE is a cross-sectional view of a comparator constructed in accordance with the invention and showing the interior with the optical elements of the apparatus.

The comparator shown comprises a base 10 on which is mounted a hollow housing 13 on which in turn is mounted a workpiece support 11 which is adjustable in at least two planes. The workpiece support 11 is mounted upon the housing 13 for vertical adjustment by means of a slide 14. The workpiece support 11, though having a number of interconnected relatively adjustable parts, defines an aperture over which the workpiece is supported.

In the housing 13 is disposed a platform for supporting a layout drawing. Provision for illuminating the drawing from underneath the platform is provided. This is indicated by 24 and the platform for the layout is 25. An access panel 26 on the rear face of the housing 13 provides access to the platform 25. The platform is inclined with respect to the base 10.

Mounted upon the housing 13 is a superstructure 15 which contains optical elements.

The superstructure has mounted upon it a microscope of which there are two eyepiece lenses 16 mounted at the end of a flattened tubular extension 17, and there is an objective lens 18, and a prism 19. The microscope elements 16, 18 and 19 are mounted upon the superstructure 15 for rotation about a vertical axis, by means of a bearing 26, the microscope can also be adjusted in a plane normal to the vertical axis to change the field of view, relative to the workpiece, by adjusting screws (not shown).

In the top of the superstructure 15 is mounted a mirror 20 presented to the interior of the housing. Adjacent to this is a reducing lens assembly 21. Also mounted in the superstructure and beneath the objective lens 18 of the microscope there is a beam splitter prism assembly comprising two prisms 22 and 23, which are in face to face contact. The interface between the prisms 22 and 23 is used to reflect the image of the layout which is seen through the mirror and the reducing lens 21, and through the microscope elements. In an alternative construction, the mirror is omitted and the platform for the layout is in line with the reducing lens. However, the construction illustrated is more convenient.

The workpiece, which is supported upon the workpiece table 11, is also visible through the microscope on a scale which is the same as the scale of the visible image of the layout, the workpiece being viewed through the two prisms 22 and 23.

The prism 23, however, is extended to provide a surface 23a through which light is transmitted from a light source 27 mounted in the superstructure 15 for internal reflection upon a surface 23b of the prism 23. This surface is externally silvered so that light is internally reflected off it, and onto the interface between the prisms 22 and 23 so that the light is projected onto the workpiece from the direction from which the workpiece is viewed.

The light source 27 is a quartz hologen bulb and there is also a collimating lens system 28 between the bulb and the prism 23.

If the workpiece surface is not normal to the direction of projection of the light through the prism 23, the lighting provided by the light source 27 may be insufficient. In such circumstances an externally mounted light (not shown) is provided which can be adjusted to throw light in the required direction.

Provision is also made for illumination of the workpiece from below by means of a light source 29 over which may be provided a color filter 30, if required.

In use, the operator can view the image of the workpiece through the microscope and can also view the image of the layout which is reflected on the interface of the prisms 22 and 23, and appears in the same plane and is at the same scale. The lighting arrangements are adjusted until maximum contrast between the images is obtained.

The layout scale is normally 50 to 1 but by changing the reducing lens, the reduction can be, for example, 30 to 1 or 40 to 1.

The magnification produced by the microscope is, in this example, 25 to 1.

The layout occupies a space on the platform approximately 30 inches by 30 inches and is preferably in the form of a transparent sheet with an opaque coating which is removed over certain areas by scribing to define the profile which is required on the workpiece.

In an alternative arrangement the layout is illuminated from above, such illumination also being arranged to provide some lighting on the top surface of the workpiece.

Having thus described my invention what I claim as new and desire to secure by Letters Patent:

1. An optical comparator comprising, in combination, a workpiece support, a platform for supporting an enlarged layout of a profile for comparison with a profiled workpiece, a microscope including an objective lens positioned along an optical axis for viewing the workpiece, and optical elements including means whereby an image of the layout on the platform is reduced and including further means whereby said image is superimposed in scale upon an image of the workpiece in a plane intersecting said optical axis in front of said microscope objective lens, whereby said images are visible through the microscope, at the same magnification.

2. An optical comparator as claimed in claim 1 in which the said optical elements comprise a reducing lens element through which an image of the layout passes, and a prism element whereby the image is aligned with the image of a workpiece viewed by an operator.

3. An optical comparator as claimed in claim 2 in which the layout image is reflected by a mirror before passing through the lens element.

4. An optical comparator as claimed in claim 2 in which the prism element includes a portion directed towards a light source from which light is reflected through the prism element towards the workpiece.

5. An optical comparator as claimed in claim 1 in which the microscope is adjustably mounted to enable the field of view to be varied.

6. An optical comparator as claimed in claim 1 in which the workpiece support is adjustably mounted upon a base of the optical comparator.

7. An optical comparator as claimed in claim 2 in which the reducing lens element is interchangeable with other reducing lens elements so that the degree of reduction can be varied.

* * * * *